United States Patent
Tao et al.

(10) Patent No.: US 10,425,296 B2
(45) Date of Patent: Sep. 24, 2019

(54) METHOD AND SYSTEM FOR PROVIDING SERVICE ACCORDING TO POLICY

(71) Applicant: Huawei Technologies Co., Ltd., Shenzhen, Guangdong (CN)

(72) Inventors: Yuan Tao, Shenzhen (CN); Bin Zhen, Beijing (CN); Qi Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 366 days.

(21) Appl. No.: 15/248,411

(22) Filed: Aug. 26, 2016

(65) Prior Publication Data

US 2016/0366032 A1 Dec. 15, 2016

Related U.S. Application Data

(63) Continuation of application No. PCT/CN2014/072628, filed on Feb. 27, 2014.

(51) Int. Cl.
*H04W 4/70* (2018.01)
*H04L 12/24* (2006.01)
*H04L 29/14* (2006.01)

(52) U.S. Cl.
CPC .......... *H04L 41/5054* (2013.01); *H04L 69/40* (2013.01); *H04W 4/70* (2018.02)

(58) Field of Classification Search
None
See application file for complete search history.

(56) References Cited

U.S. PATENT DOCUMENTS

| 6,167,445 | A | 12/2000 | Gai et al. | |
|---|---|---|---|---|
| 2004/0039803 | A1 | 2/2004 | Law | |
| 2010/0188975 | A1* | 7/2010 | Raleigh | G06Q 10/06375 370/230.1 |
| 2011/0145425 | A1* | 6/2011 | Xiao | H04L 41/28 709/229 |
| 2012/0016942 | A1* | 1/2012 | Cherian | H04W 4/70 709/206 |

(Continued)

FOREIGN PATENT DOCUMENTS

| CN | 101959192 A | 1/2011 |
|---|---|---|
| CN | 102238517 A | 11/2011 |

(Continued)

OTHER PUBLICATIONS

'Architecture Analysis—Part 1: Analysis . . . ', oneM2M website, Jul. 28, 2013 [retrieved on Sep. 23, 2018]. Retrieved from the Internet: <URL: http://www.onem2m.org/component/rsfiles/download-file/files?path=Draft_TR%255ConeM2M-TR-0002-Architecture_Analysis_Part_1-V0_2_0.doc>. (Year: 2013).*

(Continued)

*Primary Examiner* — Esther B. Henderson
*Assistant Examiner* — Dae Kim
(74) *Attorney, Agent, or Firm* — Staas & Halsey LLP

(57) ABSTRACT

The present invention relates to the field of data transmission, and discloses a method and system for providing a service according to a policy, which are used to resolve a problem that policy information included in information transmitted by different NSEs and different AEs cannot be correctly understood and executed by using an existing M2M system architecture, which results in a data transmission error or transmission failure.

13 Claims, 3 Drawing Sheets

(56) References Cited

U.S. PATENT DOCUMENTS

| | | | | |
|---|---|---|---|---|
| 2012/0117140 A1* | 5/2012 | Wang | ............... | H04W 4/005 709/201 |
| 2013/0205365 A1* | 8/2013 | Choi | ............... | G06F 21/57 726/1 |
| 2013/0246593 A1 | 9/2013 | Bryskin et al. | | |
| 2014/0215043 A1* | 7/2014 | Ryu | ............... | H04W 4/70 709/223 |
| 2015/0039635 A1* | 2/2015 | Monjas Llorente | .. | H04L 65/605 707/754 |
| 2016/0007137 A1* | 1/2016 | Ahn | ............... | H04W 4/70 370/254 |

FOREIGN PATENT DOCUMENTS

| | | |
|---|---|---|
| CN | 102986257 A | 3/2013 |
| CN | 103270735 A | 8/2013 |
| EP | 2640003 A1 | 9/2013 |

OTHER PUBLICATIONS

'OneM2M Functional Architecture Baseline Draft', oneM2M website, Aug. 1, 2014 [retrieved on Sep. 23, 2018]. Retrieved from the Internet: <URL: http://www.onem2m.org/images/files/deliverables/TS-0001-oneM2M-Functional-Architecture-V-2014-08.pdf>. (Year: 2014).*

Kamal et al., A Policy Based Management Framework for Machine to Machine Networks and Services, Sep. 21, 2011 [retrieved on Sep. 23, 2018]. Retrieved from the Internet: <URL: https://ieeexplore.ieee.org/document/6076967>. (Year: 2011).*

Jonas Sandberg, "Administrative Queries in XACML—feasibility of partial-query evaluation", Department of Computer Systems Sciences Royal Institute of Technology, Dec. 1, 2006, 129 pages, XP055019353.

Huawei Technologies Co., Ltd., "Clarify the usages of the terms Permissions and privileges in TS-0001", oneM2M, vol. WG2-Architecture, ARC, Feb. 10, 2014, 171 pages, XP084004758.

* cited by examiner

METHOD AND SYSTEM FOR PROVIDING SERVICE ACCORDING TO POLICY

CROSS-REFERENCE TO RELATED APPLICATIONS

This application is a continuation of International Application No. PCT/CN2014/072628, filed on Feb. 27, 2014, which is hereby incorporated by reference in its entirety

TECHNICAL FIELD

The present invention relates to the field of data transmission technologies, and in particular, to a method and system for providing a service according to a policy.

BACKGROUND

Machine-to-machine communications (Machine-to-Machine Communications, M2M) is a network-based application and service that uses intelligent interaction between machines as the core, and implements data communication without manual intervention by embedding a wireless or wired communications module and application processing logic into a machine, to satisfy an information requirement of a user in aspects such as monitoring, commanding and scheduling, data collection, and measurement.

oneM2M is a global organization that is established by a union that includes multiple ICT (Information Communication Technology, information and communications technology) standard organizations, and aims to standardize effective deployment of M2M communications systems. An M2M system architecture defined by one M2M includes three parts, which are separately an AE (Application Entity, application entity) 11, a CSE (Common Services Entity, common service entity) 12, and an NSE (Underlying Network Service Entity, underlying network service entity) 13, as shown in FIG. 1. In the system architecture, the AE and the CSE perform communication by using an Mca reference point, the CSE and the NSE perform communication by using an Mcn reference point, and different CSEs perform communication by using an Mcc reference point, where the reference points refer to interfaces that are used in a communication process, and may be a same interface that can implement various functions, or may be an interface that implements different functions.

The CSE includes multiple CSF (Common Service Function, common service function) modules, configured to implement different functions. One CSE may include multiple types of CSF modules, where two types of CSF modules: an NSE (Network Service Exposure, Service Execution and Triggering, network service exposure, service execution and triggering) module and a CMDH (Communication Management and Delivery Handling, communication management and delivery handling) module 15, and another CSF module 16 in addition to these two types of modules may be included. The CMDH module is responsible for processing an information transmission task between the CSE and the NSE, that is, receiving information and transmitting different types of information in different manners according to preset manners. The NSE module is responsible for processing another CSF request, and transferring a request to the NSE by using an Mcn reference point, or transferring a request or a response of an NSES to a corresponding CSF. The CMDH module is responsible for determining a communication path that is used to perform transmission between the CSE and the AE and between the CSE and the NSE at a time point.

However, when information sent by the AE or the NSE includes policy information that indicates a condition that a service specified by the information needs to satisfy, or the like, because the NSE module defined in the existing M2M system architecture does not have a function of understanding and executing policy information, the NSE module cannot perform corresponding processing on the information according to the policy information in the information, and in addition, the CMDH module can perform corresponding processing only according to an attribute of the received information itself, and cannot learn the policy information included in the information. Therefore, the NSE module and the CMDH module that are responsible for processing a data transmission task in the existing M2M system architecture cannot correctly understand and execute policy information included in information transmitted by different NSEs and different AEs, which results in a data transmission error or transmission failure.

SUMMARY

Embodiments of the present invention provide a method and system for providing a service according to a policy, which are used to resolve a problem that policy information included in information transmitted by different NSEs and different AEs cannot be correctly understood and executed in an existing M2M system architecture, which results in a data transmission error or transmission failure.

To achieve the foregoing objective, the following technical solutions are used in the embodiments of the present invention.

According to a first aspect, an embodiment of the present invention provides a method for providing a service according to a policy, applied to a system that is based on an M2M (Machine To Machine, machine-to-machine) system architecture, where a CSE of the system includes one CSF module that includes both a PE (Policy Enforcement, policy enforcement) module and a PD (Policy Decision, policy decision) module, or the CSE includes two CSF modules one of which includes a PE module and the other one of which includes a PD module; the PE module and the PD module can communicate with another CSF module in the CSE and an AE; the PE module can communicate with an NSE; and the PE module and the PD module can also communicate with each other, the method including:

receiving, by the PE module, service request information that is sent by the AE or the NSE;

translating, by the PE module, policy information included in the received service request information to a language that can be supported by the PD module, where the policy information refers to information that is needed by the PD module to determine a service policy;

sending, by the PE module to the PD module, the policy information that is obtained through translation, so that the PD module can determine the service policy according to the policy information; and acquiring, by the PE module, the service policy that is determined by the PD module, and providing, according to the service policy, a service that is requested by the service request information.

With reference to the first aspect, in a first possible implementation manner of the first aspect, the performing a task of providing a service according to the service policy includes:

when the service request information is used by the AE to request a service, translating, by the PE, the service policy determined by the PD module to a language supported by the NSE that provides a service, and sending, to the NSE, service request information that includes the translated service policy, so that the NSE provides a service according to translated service request information; or when the service request information is used by the AE to respond to a service, translating, by the PE, the service policy to a language supported by the AE that provides a service, and sending, to the AE that provides a service, service request information that includes the translated service policy, so that the AE that provides a service provides a service according to the service request information.

With reference to the first possible implementation manner of the first aspect, in a second possible implementation manner, the receiving, by the PE module, service request information that is sent by the AE or the NSE includes:

receiving, by the PE module by using an Mcn reference point, the service request information that is sent by the NSE, or receiving, by the PE module by using an Mca reference point, the service request information that is sent by the AE, and acquiring rule information of the AE, where the rule information is used to limit a rule according to which a service requester uses data in the AE or the CSF, or a rule according to which the AE or the CSF provides a service.

With reference to the second possible implementation manner of the first aspect, in a third possible implementation manner, the PE module sends, to the NSE by using an Mcn reference point, service request information that includes the translated service policy; sends, to another CSF by using an Ic reference point, the service policy that is determined by the PD module, where the Ic reference point refers to an interface that is used to perform communication between the PE module and the another CSF module; and sends, to the PD module by using an Ia reference point, the policy information that is obtained through translation, and acquires, by using the Ia reference point, the service policy that is determined by the PD module, where the Ia reference point refers to an interface that is used to perform communication between the PE module and the PD module.

With reference to the third possible implementation manner of the first aspect, in a fourth possible implementation manner, the policy information includes access permission and a requested service type of the AE, a time range, and required QoS and a required processing priority; or a network type and a requested service type of the NSE; or read permission of data provided by the NSE; or data that needs to be provided by the AE or the another CSF module.

With reference to the first aspect, in a fifth possible implementation manner, the method further includes: determining, by the PD module according to access permission of the AE or the NSE in the policy information, whether to permit the AE or the NSE to perform access, and deciding, when the AE or the NSE is permitted to perform access, the service policy according to content included in the policy information; or searching, by the PD module, the policy information for rule information that needs to be provided by the AE or another CSF module, acquiring, by the PD module when the rule information is not stored in the PD module, the rule information from the AE or the CSF that can provide data, and deciding, by the PD module, the service policy according to the acquired rule information.

With reference to the first aspect, in a sixth possible implementation manner, the PD module acquires, from the CSF by using an Ib reference point, rule information that is in the policy information and that needs to be provided by another CSF module, where the Ib reference point is an interface that is used to perform communication between the PD module and another CSF.

According to a second aspect, the present invention provides a system for providing a service according to a policy, where the system is based on an M2M system architecture, a CSE of the system includes one CSF module that includes both a PE module and a PD module, or the CSE includes two CSF modules one of which includes a PE module and the other one of which includes a PD module; the PE module and the PD module can communicate with another CSF module in the CSE and an AE; the PE module can communicate with an NSE; and the PE module and the PD module can also communicate with each other, where the PE module is configured to receive service request information that is sent by the AE or the NSE, translate policy information included in the received service request information to a language that can be supported by the PD module, send the translated policy information to the PD module, acquire a service policy that is determined by the PD module according to the policy information, and provide, according to the service policy, a service that is requested by the service request information; and the PD module is configured to receive the translated policy information that is sent by the PE module, and determine the service policy according to the policy information.

With reference to the second aspect, in a first possible implementation manner of the second aspect, the PE module is further configured to: when the service request information is used by the AE to request a service, translate the service policy determined by the PD module to a language supported by the NSE that provides a service, and send, to the NSE, service request information that includes the translated service policy, so that the NSE provides a service according to translated service request information; or when the service request information is used by the AE to respond to a service, translate, by the PE, the service policy to a language supported by the AE that provides a service, and send, to the AE that provides a service, service request information that includes the translated service policy, so that the AE that provides a service provides a service according to the service request information.

With reference to the first possible implementation manner of the second aspect, in a second possible implementation manner, the PE module is further configured to receive, by using an Mcn reference point, the service request information that is sent by the NSE; or receive, by using an Mca reference point, the service request information that is sent by the AE, and acquire rule information of the AE, where the rule information is used to limit a rule according to which a service requester uses data in the AE or the CSF, or a rule according to which the AE or the CSF provides a service.

With reference to the second possible implementation manner of the second aspect, in a third possible implementation manner, the PE module sends, to the NSE by using an Mcn reference point, service request information that includes the translated service policy; sends, to another CSF by using an Ic reference point, the service policy that is determined by the PD module, where the Ic reference point refers to an interface that is used to perform communication between the PE module and the another CSF module; and sends, to the PD module by using an Ia reference point, the policy information that is obtained through translation, and acquires, by using the Ia reference point, the service policy that is determined by the PD module, where the Ia reference point refers to an interface that is used to perform communication between the PE module and the PD module.

With reference to the third possible implementation manner of the second aspect, in a fourth possible implementation manner, the policy information includes access permission and a requested service type of the AE, a time range, and required QoS and a required processing priority; or a network type and a requested service type of the NSE; or read permission of data provided by the NSE; or data that needs to be provided by the AE or the another CSF module.

With reference to the fourth possible implementation manner of the second aspect, in a fifth possible implementation manner, the PD module is further configured to determine, according to access permission of the AE or the NSE in the policy information, whether to permit the AE or the NSE to perform access, and determine, when the AE or the NSE is permitted to perform access, the service policy according to content included in the policy information; or is configured to search the policy information for rule information that needs to be provided by the AE or another CSF module, acquire, by the PD module when the rule information is not stored in the PD, the rule information from the AE or the CSF that can provide the rule information, and determine, by the PD module, the service policy according to the acquired rule information.

With reference to the fifth possible implementation manner of the second aspect, in a sixth possible implementation manner, the PD module is further configured to acquire, from the CSF by using an Ib reference point, rule information that is in the policy information and that needs to be provided by another CSF module, where the Ib reference point is an interface that is used by the PD module to acquire data from the CSF.

The embodiments of the present invention provide a method and system for providing a service according to a policy, which use a method in which a system based on an M2M system architecture is used; a PE module included in the system receives a request service message or a response service message from an AE or an NSE, translates policy information included in the received request service message or response service message to a language that can be supported by a PD module, and sends, to the PD module, the policy information that is obtained through translation; the PD module determines a service policy according to the received policy information; and the PE module performs a corresponding task of providing a service according to the service policy that is determined by the PD. In this way, a new functional module is added to the original system framework, and a manner in which a PE module is responsible for translating policy information, and a PD module is responsible for deciding a service policy according to the policy information is used, which offsets a disadvantage in the prior art that an NSE module and a CMDH module cannot understand and cannot acquire policy information included in service request information, enables the PE module and the PD module to accurately perform a corresponding service task according to the policy information in the service request information, and resolves a problem that the NSE module and the CMDH module that are responsible for processing an information transmission task in an existing M2M system architecture cannot correctly understand and execute policy information included in information transmitted by different NSEs and different AEs, which results in a data transmission error or transmission failure.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
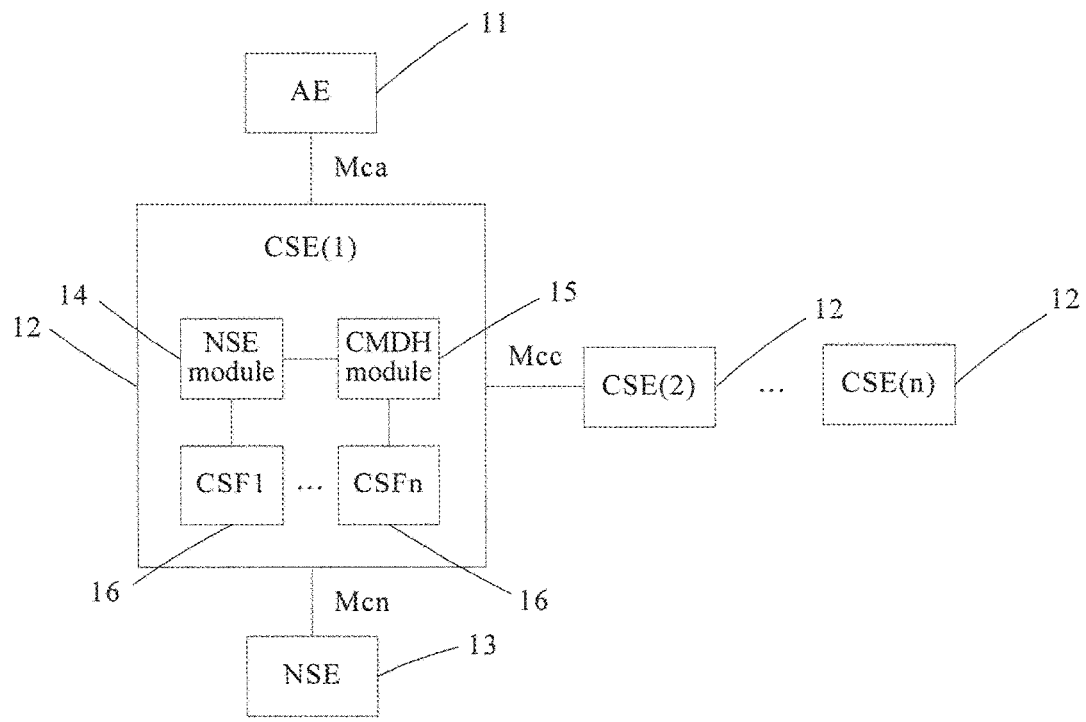
FIG. 1 is a schematic diagram of a system in the prior art in the background according to the present invention.
Figure 2:
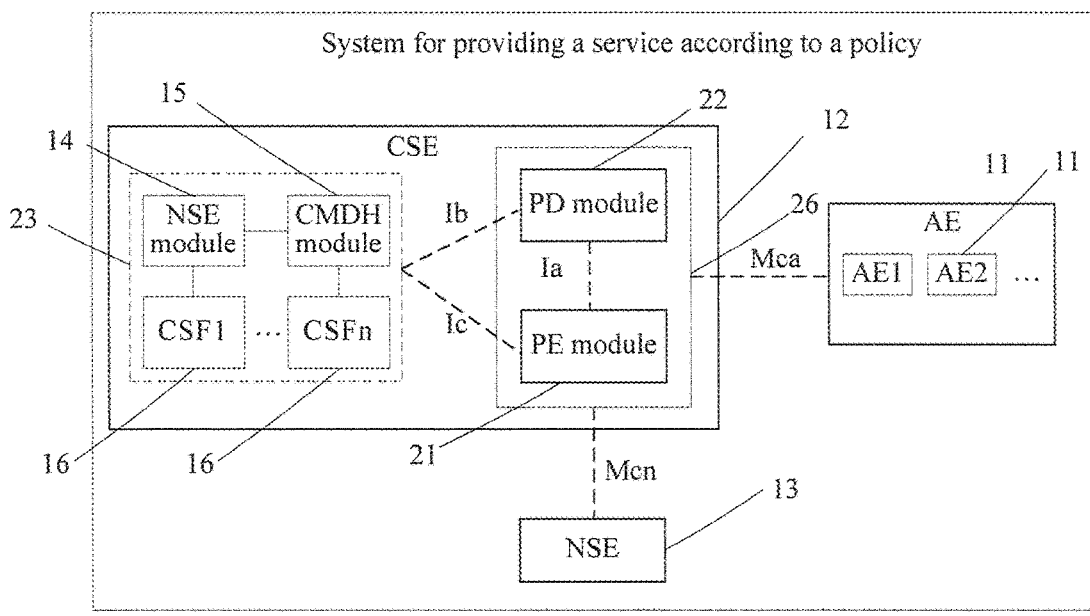
FIG. 2 is a schematic diagram of a system for providing a service according to a policy according to an embodiment of the present invention.
Figure 3:
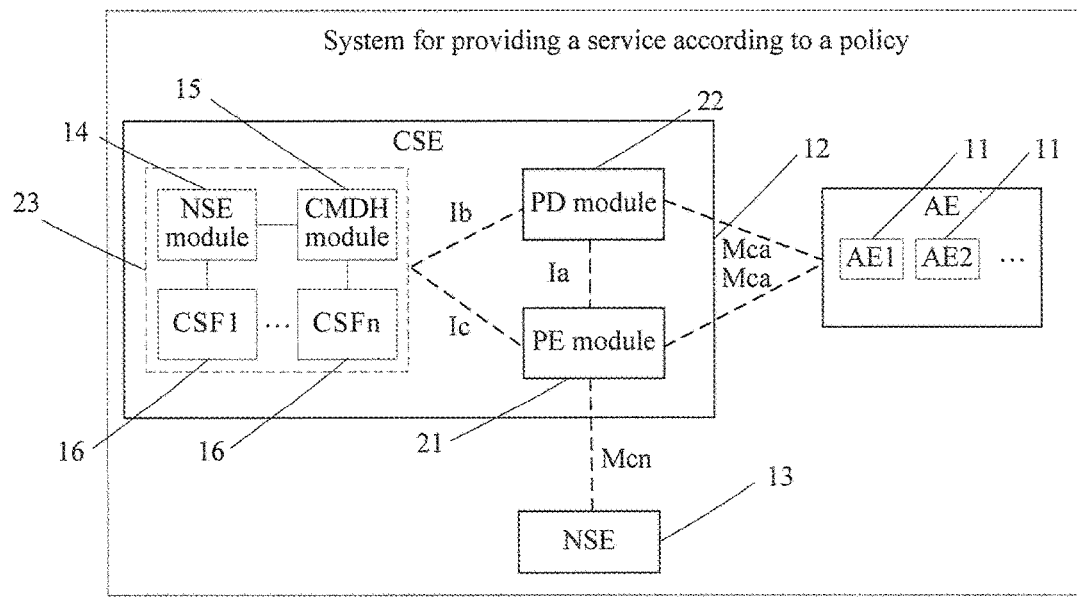
FIG. 3 is a schematic diagram of another system for providing a service according to a policy according to an embodiment of the present invention.

An embodiment of the present invention provides a system for providing a service according to a policy, where the system is based on an M2M system architecture, a CSE 12 of the system includes one CSF module that includes both a PE module 21 and a PD module 22, as shown in FIG. 2, or the CSE 12 includes two CSF modules 26 that separately include a PE module 21 and a PD module 22, as shown in FIG. 3; the PE module 21 and the PD module 22 can communicate with another CSF module 23 in the CSE and an AE 11; the PE module can communicate with an NSE 13; and the PE module 21 and the PD module 22 can also communicate with each other.

In this embodiment, when one CSF includes both a PE module and a PD module, it may be understood as that the CSF has both a policy enforcement function and a policy decision function; and when one CSF includes a PE module and the other CSF includes a PD module, it may be understood as that one CSF has a policy enforcement function, and the other CSF has a policy decision function.

The PE module 21 is configured to receive service request information that is sent by the AE 11 or the NSE 13, translate policy information included in the received service request information to a language that can be supported by the PD module 22, send the translated policy information to the PD module 22, acquire a service policy that is determined by the PD module 22 according to the policy information, and provide, according to the service policy, a service that is requested by the service request information; and the PD module 22 is configured to receive the translated policy information that is sent by the PE module 21, and determine the service policy according to the policy information.

Optionally, the PE module 21 is further configured to: when the service request information is used by the AE 11 to request a service, translate the service policy determined by the PD module 22 to a language supported by the NSE 13 that provides a service, and send, to the NSE 13, service request information that includes the translated service policy, so that the NSE 13 provides a service according to translated service request information; or when the service request information is used by the AE 11 to respond to a service, translate, by the PE module 21, the service policy to a language supported by the AE 11 that provides a service, and send, to the AE 11 that provides a service, service request information that includes the translated service policy, so that the AE 11 that provides a service provides a service according to the service request information. The PE module 11 is further configured to: when the service request information is used by an AE 14 to request a service, translate the service policy determined by the PD module 12 to a language supported by the NSE 15 that provides a service, and send, to the NSE 15, service request information that includes the translated service policy, so that the NSE 15 provides a service according to translated service request information; and when the service request information is used by the AE 14 to respond to a service, translate, by the PE, the service policy to a language supported by the AE 14 that provides a service, and send, to the AE 14 that provides a service, service request information that includes the translated service policy, so that the AE 14 that provides a service provides a service according to the service request information.

Optionally, the PE module 21 is further configured to receive, by using an Mcn reference point, the service request information that is sent by the NSE 13; or receive, by using an Mca reference point, the service request information that is sent by the AE 11, and acquire rule information of the AE 11, where the rule information is used to limit a rule according to which a service requester uses data in the AE 11 or the CSF, or a rule according to which the AE 11 or the CSF provides a service.

Optionally, the PE module 21 is further configured to send, to the NSE 13 by using an Mcn reference point, service request information that includes the translated service policy; send, to another CSF 23 by using an Ic reference point, the service policy that is determined by the PD module 22, where the Ic reference point refers to an interface that is used to perform communication between the PE module 21 and the another CSF module 23; and send, to the PD module 22 by using an Ia reference point, the policy information that is obtained through translation, and acquire, by using the Ia reference point, the service policy that is determined by the PD module 22, where the Ia reference point refers to an interface that is used to perform communication between the PE module 21 and the PD module 22.

Optionally, the policy information includes access permission and a requested service type of the AE 11, a time range, and required QoS and a required processing priority; or a network type and a requested service type of the NSE 13; or read permission of data provided by the NSE; or data that needs to be provided by the AE or the another CSF module.

Optionally, the PD module is further configured to receive the policy information translated by the PE, determine, according to access permission of the AE or the NSE in the policy information, whether to permit the AE or the NSE to perform access, and determine, when the AE or the NSE is permitted to perform access, the service policy according to content included in the policy information; or is configured to search the policy information for rule information that needs to be provided by the AE or another CSF module, acquire, by the PD module 22 when the rule information is not stored in the PD, the rule information from the AE 11 or the CSF that can provide the data, and determine, by the PD module 22, the service policy according to the acquired rule information.

Optionally, the PD module 22 is further configured to acquire, from the CSF by using an Ib reference point, rule information that is in the policy information and that needs to be provided by another CSF module 23, where the Ib reference point is an interface that is used to perform communication between the PD module 22 and another CSF 23.

This embodiment of the present invention provides a system for providing a service according to a policy, which uses a method in which a system based on an M2M system architecture is used; a PE module included in the system receives a request service message or a response service message from an AE or an NSE, translates policy information included in the received request service message or response service message to a language that can be supported by a PD module, and sends, to the PD module, the policy information that is obtained through translation; the PD module determines a service policy according to the received policy information; and the PE module performs a corresponding task of providing a service according to the service policy that is determined by the PD. In this way, a new functional module is added to the original system framework, and a manner in which a PE module is responsible for translating policy information, and a PD module is responsible for deciding a service policy according to the policy information is used, which offsets a disadvantage in the prior art that an NSE module and a CMDH module cannot understand and cannot acquire policy information included in service request information, enables the PE module and the PD module to accurately perform a corresponding service task according to the policy information in the service request information, and resolves a problem that the NSE module and the CMDH module that are responsible for processing an information transmission task in an existing M2M system architecture cannot correctly understand and execute policy information included in information transmitted by different NSEs and different AEs, which results in a data transmission error or transmission failure.

Figure 4:
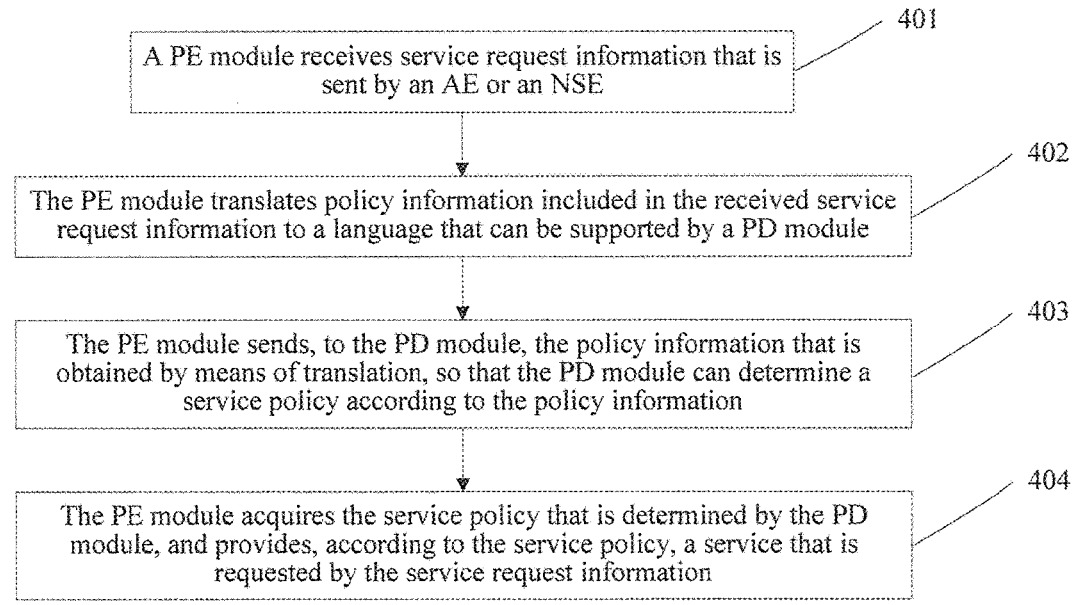
FIG. 4 is a flowchart of a method for providing a service according to a policy according to an embodiment of the present invention.

An embodiment of the present invention further provides a method for providing a service according to a policy, applied to a system that is based on an M2M system architecture, where a CSE of the system includes one CSF module that includes both a PE module and a PD module, or the CSE includes two CSF modules one of which includes a PE module and the other one of which includes a PD module; the PE module and the PD module can communicate with another CSF module in the CSE and an AE; the PE module can communicate with an NSE; and the PE module and the PD module can also communicate with each other. A procedure of the method is shown in FIG. 4, and specifically includes:

401. The PE module receives service request information that is sent by the AE or the NSE.

The service request information is used by the AE to request a service or respond to a service, or is used by the NSE to request a service or respond to a service. The PE module is configured to implement a function of information translation and policy enforcement, and is responsible for translating, to a language supported by the PD, the service request information that is from the AE or the NSE and that is received by the CSE, and translating, after a service policy is acquired, the service policy to a language supported by a corresponding AE or NSE. The PE module receives, by using an Mcn reference point, the service request information that is sent by the NSE, or receives, by using an Mca reference point, the service request information that is sent by the AE.

402. The PE module translates policy information included in the received service request information to a language that can be supported by the PD module.

The PD module is configured to implement a function of policy acquiring, policy saving, and policy decision. The policy information includes content such as access permission and a requested service type of the AE, a time range, and required QoS and a required processing priority; or a network type and a requested service type of the NSE; or read permission of data provided by the NSE; or data that needs to be provided by the AE or the another CSF module. For example, the requested service type may include different requested data, different requested information, or the like; or the time range may include latest information, history information within a time segment, or the like; or the network type of the NSE may include 3GPP, or WLAN, or Zigbee, or the like, which all require the PD module to determine different service policies according to different cases.

The policy information refers to information that is needed by the PD module to determine a service policy, and may include access permission and a requested service type of the AE, a time range, and required quality of service QoS and a required processing priority, or a network type and a requested service type of the NSE, or access permission of data provided by the NSE, or a type of information such as rule information that needs to be provided by the AE or the another CSF module, or another type of information, which are not enumerated herein again in the present invention.

In addition, for the NSE, multiple types of underlying networks such as 3GPP, WLAN, Zigbee, and Bluetooth may exist, and different types of underlying networks all have languages of the different types of underlying networks; and for AEs, multiple different AEs may also exist, and different AEs may also use languages of the different AEs; therefore, when the NSE and the AE communicate with each other, communicated information needs to be translated in a communication process, so that both communication parties can understand communicated content. When translating the policy information, the PE may choose to uniformly translate the information to one fixed language or several fixed languages, and then, transmit the information to the PD module to perform a step of deciding a service policy. A specific language and quantity may be determined according to an actual case, and is no longer further limited in the present invention.

It should be noted that after the PE module receives a service request, if the PE module detects policy information included in the request information, the PE module translates the detected policy information; or if the PE module does not detect policy information, the PE module forwards the service request in a regular manner. That is, a transmission path of the service request is determined only according to an attribute of the service request. In a manner of detecting policy information, a particular identifier may be set for policy information, or whether request information includes policy information may be distinguished by using a particular language or another manner; and certainly, another feasible manner may also be used, and is not limited in excessive details in this embodiment of the present invention.

403. The PE module sends, to the PD module, the policy information that is obtained through translation, so that the PD module can determine a service policy according to the policy information.

The PE module sends, to the PD module by using an Ia reference point, the policy information that is obtained through translation, where the Ia reference point refers to an interface that is used to perform communication between the PE module and the PD module.

404. The PE module acquires the service policy that is determined by the PD module, and provides, according to the service policy, a service that is requested by the service request information.

The PE module acquires, by using the Ia reference point, the service policy that is determined by the PD module. The PE module may deliver, to a corresponding service provider determined by the service policy, the service policy that is determined by the PD module, to provide the service requested by the service request information. A specific execution manner is:

when the service request information is used by the AE to request a service, translating, by the PE, the service policy determined by the PD module to a language supported by the NSE that provides a service, and sending, to the NSE, service request information that includes the translated service policy, so that the NSE provides a service according to translated service request information, where the PE module sends, to the NSE by using an Mcn reference point, the service request information that includes the translated service policy, the PE module sends, to the another CSF by using an Ia reference point, the service policy that is determined by the PD module, where the Ia reference point refers to an interface that is used to perform communication between the PE module and the PD module; or when the service request information is used by the AE to respond to a service, translating, by the PE, the service policy to a language supported by the AE that provides a service, and sending, to the AE that provides a service, service request information that includes the translated service policy, so that the AE that provides a service provides a service according to the service request information, where the PE module sends, by using an Mca reference point to the AE that provides a service, the service request information that includes the translated service policy, where the Ic reference point refers to an interface for policy enforcement.

In addition, it should be noted that the PD module and the PE module may be separately an independent CSF module, or may be two parts in a same CSF module. When the PD module and the PE module belong to a same CSF module, the Ia reference point is an interface that is used for communication inside the CSF module that includes the PD module and the PE module.

This embodiment of the present invention provides a method for providing a service according to a policy, which uses a method in which a system based on an M2M system architecture is used; a PE module included in the system receives a request service message or a response service message from an AE or an NSE, translates policy information included in the received request service message or response service message to a language that can be supported by a PD module, and sends, to the PD module, the policy information that is obtained through translation; the PD module determines a service policy according to the received policy information; and the PE module performs a corresponding task of providing a service according to the service policy that is determined by the PD. In this way, a new functional module is added to the original system framework, and a manner in which a PE module is responsible for translating policy information, and a PD module is responsible for deciding a service policy according to the policy information is used, which offsets a disadvantage in the prior art that an NSE module and a CMDH module cannot understand and cannot acquire policy information included in service request information, enables the PE module and the PD module to accurately perform a corresponding service task according to the policy information in the service request information, and resolves a problem that the NSE module and the CMDH module that are responsible for processing an information transmission task in an existing M2M system architecture cannot correctly understand and execute policy information included in information transmitted by different NSEs and different AEs, which results in a data transmission error or transmission failure.

Figure 5:
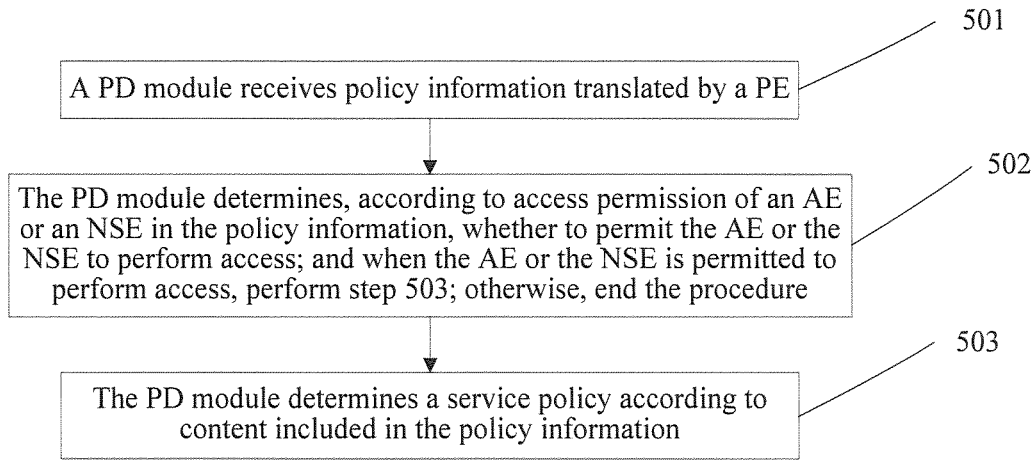
FIG. 5 is a flowchart of a method for deciding a service policy according to an embodiment of the present invention.

In addition, an embodiment of the present invention further provides a method for a PD module to determine a service policy according to policy information. A procedure of the method is shown in FIG. 5, and specifically includes:

501. A PD module receives policy information translated by a PE.

502. The PD module determines, according to access permission of an AE or an NSE in the policy information, whether to permit the AE or the NSE to perform access; and when the AE or the NSE is permitted to perform access, perform step 503; otherwise, end the procedure.

Different AEs or NSEs may have different access permission, which includes different settings such as permission for access, permission for restricted access, prohibition against access, and access at a restricted time, where permission for access indicates that the AE or the NSE has permission to request a corresponding service, and in this case, how to provide a service or what a service is requested can be further determined.

503. The PD module determines a service policy according to content included in the policy information.

The PD module may determine a service policy according to a requested service type, a time range, required QoS and a required processing priority, or a network type and a requested service type of the NSE, or access permission of data provided by the NSE, or the like that are included in the policy information. A specific decision manner does not fall within the scope of the present invention; therefore, details are not described herein again.

In this embodiment of the present invention, a PD module receives policy information translated by a PE module, determines, according to access permission of an AE or an NSE in the policy information, whether to permit the AE or the NSE to perform access, and determines a service policy according to content in the policy information when the AE or the NSE is permitted to perform access, which provides an implementation manner for the PD to determine a service policy, and provides an implementation manner for a CSE to understand policy information in service request information, so that the CSE can provide corresponding service policies according to service request information sent by different AEs and NSEs, thereby making correct information transmission possible.

Figure 6:
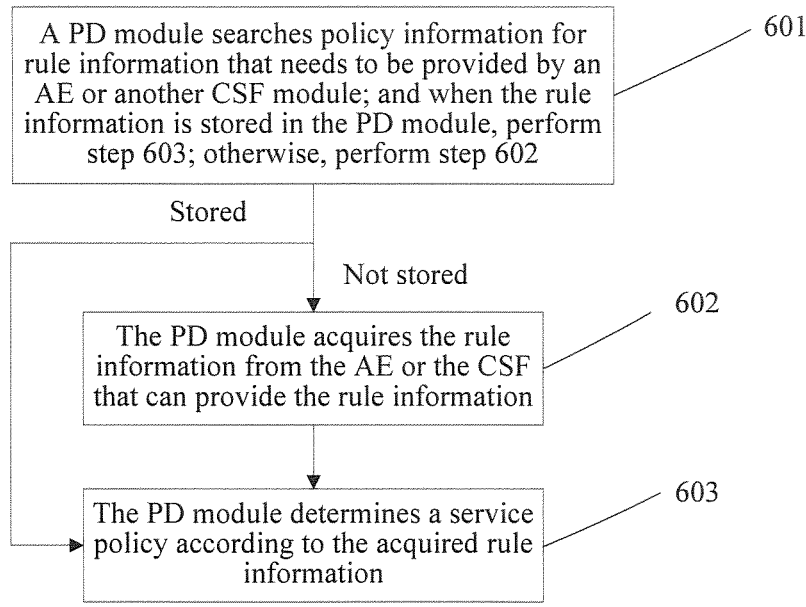
FIG. 6 is a flowchart of another method for deciding a service policy according to an embodiment of the present invention.

Further, an embodiment of the present invention further provides another method for a PD module to determine a service policy according to policy information. A procedure of the method is shown in FIG. 6, and specifically includes:

601. The PD module searches policy information for rule information that needs to be provided by an AE or another CSF module; and when the rule information is stored in the PD module, perform step 603; otherwise, perform step 602.

When performing decision, the PD module may need an AE or another CSF module to provide corresponding rule information. In this case, if the rule information is already stored in the PD module, the stored rule information may be directly read for use, where the rule information is used to limit a rule according to which a service requester uses data in the AE or the CSF, or a rule according to which the AE or the CSF provides a service.

602. The PD module acquires the rule information from the AE or the CSF that can provide the rule information.

The PD module acquires, from the AE by using an Mca reference point, the rule information that is in the policy information and needs to be provided by the AE, or acquires, from the CSF by using an Ib reference point, the rule information that is in the policy information and needs to be provided by the another CSF; and the PD may store the acquired rule information to the PD to directly perform read for use when the rule information is to be used again subsequently. The Ib reference point is an interface that is used to perform communication between the PD module and another CSF.

603. The PD module determines a service policy according to the acquired rule information.

If the service policy needs to be determined only according to the acquired rule information, decision is directly performed according to the rule information; or if decision further needs to be performed with reference to other policy information, the service policy is determined with reference to corresponding policy information after the rule information is acquired.

In this embodiment of the present invention, when a PD module needs another CSF module to provide corresponding rule information, the PD module is first searched for the rule information, the rule information is read from a corresponding CSF module when the rule information is not found, and a service policy is determined according to a read rule. This manner provides a manner of deciding a service policy according to rule information that is provided by an AE or another CSF module, so that the PD module can acquire corresponding rule information when the PD module needs to determine a service policy according to an AE or another CSF module, and the PD module can correctly provide a service policy that is limited by service request information, thereby making it possible for a CSE to correctly and completely understand policy information in the service request information.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A system for providing a service according to a policy, wherein the system is based on a machine-to-machine (M2M) system architecture, the system comprising:
   at least one M2M device comprising a common service entity (CSE), the CSE comprising:
   at least one first common service function (CSF) module that comprises a policy enforcement (PE) module implemented by at least one processor coupled to at least one memory and a policy decision (PD) module implemented by the at least one processor;
   wherein the PE module and the PD module are configured to communicate with a second CSF module implemented by the at least one processor in the CSE and an application entity (AE), the PE module is configured to communicate with an underlying network service entity (NSE), and the PE module and the PD module are configured to communicate with each other;
   wherein the PE module is configured to:
   receive service request information that is sent by the AE or the NSE,
   translate policy information comprised in the received service request information to a language that can be supported by the PD module,
   send the translated policy information to the PD module,
   acquire a service policy that is determined by the PD module according to the policy information, and
   provide, according to the service policy, a service that is requested by the service request information; and
   wherein the PD module is configured to:
   receive the translated policy information that is sent by the PE module,
   determine the service policy according to the policy information, and
   acquire, from the second CSF module using an Ib reference point, rule information that is in the policy information and that is to be provided by the second CSF module or another CSF module, wherein the Ib reference point comprises an interface for performing communication between the PD module and the second CSF module.

2. The system according to claim 1, wherein the PE module is further configured to:
   when the service request information is used by the AE to request a service, translate the service policy determined by the PD module to a language supported by the NSE, and send, to the NSE, service request information that comprises the translated service policy, the translated service policy enabling the NSE to provide a service according to the translated service policy; or
   when the service request information is used by the AE to respond to a service, translate, by the PE, the service policy to a language supported by the AE, and send, to the AE, service request information that comprises the translated policy information, the service request information enabling the AE to provide the service according to the service request information.

3. The system according to claim 1, wherein the PE module is further configured to:
   receive, using an Mcn reference point, the service request information that is sent by the NSE; or
   receive, using an Mca reference point, the service request information that is sent by the AE, and acquire rule information of the AE, wherein the rule information is for limiting a rule according to which a service requester uses data in the AE or the CSF, or a rule according to which the AE or the CSF provides a service.

4. The system according to claim 1, wherein the PE module is further configured to:
   send, to the NSE using an Mcn reference point, service request information that comprises the translated policy information;
   send, to the second CSF module using an Ic reference point, the service policy that is determined by the PD module, wherein the Ic reference point comprises an interface for performing communication between the PE module and the second CSF module; and
   send, to the PD module using an Ia reference point, the policy information that is obtained through translation, and acquire, using the Ia reference point, the service policy that is determined by the PD module, wherein the Ia reference point comprises an interface for performing communication between the PE module and the PD module.

5. The system according to claim 1, wherein the policy information comprises:
   access permission and a requested service type of the AE, a time range, and required QoS and a required processing priority; or
   a network type and a requested service type of the NSE; or
   read permission of data provided by the NSE; or
   data that is to be provided by the AE or another CSF module.

6. The system according to claim 1, wherein the PD module is further configured to:
   determine, according to access permission of the AE or the NSE in the policy information, whether to permit the AE or the NSE to perform access, and determine, when the AE or the NSE is permitted to perform access, the service policy according to content comprised in the policy information; or
   search the policy information for rule information to be provided by the AE or another CSF module, acquire, by the PD module when the rule information is not stored in the PD, the rule information from the AE or the other CSF module, and determine, by the PD module, the service policy according to the acquired rule information.

7. A method for providing a service according to a policy, wherein the method is applied to a system that is based on a machine-to-machine (M2M) system architecture, the system comprises a common service entity (CSE), the CSE comprises at least one first common service function (CSF) module that comprises a policy enforcement (PE) module and a policy decision (PD) module, the PE module and the PD module are configured to communicate with a second CSF module in the CSE and an application entity (AE), the PE module is configured to communicate with an underlying network service entity (NSE), and the PE module and the PD module are configured to communicate with each other, the method comprising:

receiving, by the PE module, service request information that is sent by the AE or the NSE;

translating, by the PE module, policy information comprised in the received service request information to a language that can be supported by the PD module, wherein the policy information comprises information enabling the PD module to determine a service policy;

sending, by the PE module to the PD module, the policy information that is obtained through translation;

determining, by the PD module, the service policy according to the policy information;

acquiring, by the PE module, the service policy that is determined by the PD module;

providing, by the PE module according to the service policy, a service that is requested by the service request information; and acquiring, by the PE module from the second CSF module using an Ib reference point, rule information that is in the policy information and that is to be provided by the second CSF module or another CSF module, wherein the Ib reference point comprises an interface for performing communication between the PD module and the second CSF module.

8. The method according to claim 7, wherein providing, according to the service policy, a service that is requested by the service request comprises:

when the service request information is used by the AE to request a service, translating, by the PE, the service policy determined by the PD module to a language supported by the NSE, and sending, to the NSE, service request information that comprises the translated service policy, the translated service policy enabling the NSE to provide a service according to translated service request information; or when the service request information is used by the AE to respond to a service, translating, by the PE, the service policy to a language supported by the AE, and sending, to the AE, service request information that comprises the translated service policy, the service request information enabling the AE to provide the service according to the service request information.

9. The method according to claim 7, wherein receiving, by the PE module, service request information that is sent by the AE or the NSE comprises:

receiving, by the PE module using an Mcn reference point, the service request information that is sent by the NSE; or receiving, by the PE module using an Mca reference point, the service request information that is sent by the AE, and acquiring rule information of the AE, wherein the rule information is for limiting a rule according to which a service requester uses data in the AE or the CSF module, or a rule according to which the AE or the CSF provides a service.

10. The method according to claim 7, further comprising:

sending, by the PE module, to the NSE using an Mcn reference point, service request information that comprises the translated policy information;

sending, by the PE module, to the second CSF module using an Ic reference point, the service policy that is determined by the PD module, wherein the Ic reference point comprises an interface for performing communication between the PE module and the second CSF module; and sending, by the PE module, to the PD module using an Ia reference point, the policy information that is obtained through translation, and acquiring, using the Ia reference point, the service policy that is determined by the PD module, wherein the Ia reference point comprises an interface for performing communication between the PE module and the PD module.

11. The method according to claim 7, wherein the policy information comprises:

access permission and a requested service type of the AE, a time range, and required QoS and a required processing priority; or a network type and a requested service type of the NSE; or read permission of data provided by the NSE; or data that is to be provided by the AE or the another CSF module.

12. The method according to claim 7, wherein the method further comprises:

determining, by the PD module according to access permission of the AE or the NSE in the policy information, whether to permit the AE or the NSE to perform access, and deciding, when the AE or the NSE is permitted to perform access, the service policy according to content comprised in the policy information; or searching, by the PD module, the policy information for rule information to be provided by the AE or another CSF module, acquiring, by the PD module when the rule information is not stored in the PD module, the rule information from the AE or the other CSF module, and deciding, by the PD module, the service policy according to the acquired rule information.

13. A method for providing a service according to a policy, wherein the method is applied to a system that is based on a machine-to-machine (M2M) system architecture, the system comprises a common service entity (CSE), the CSE comprises at least one first common service function (CSF) module that comprises a policy enforcement (PE) module and a policy decision (PD) module, the PE module and the PD module are configured to communicate with a second CSF module in the CSE and an application entity (AE), the PE module is configured to communicate with an underlying network service entity (NSE), and the PE module and the PD module are configured to communicate with each other, the method comprising:

receiving, by the PE module, service request information that is sent by the AE or the NSE;

translating, by the PE module, policy information comprised in the received service request information to a language that can be supported by the PD module, wherein the policy information comprises information enabling the PD module to determine a service policy;

sending, by the PE module to the PD module using an Ia reference point, the policy information that is obtained through translation, wherein the Ia reference point comprises an interface for performing communication between the PE module and the PD module;

determining, by the PD module, the service policy according to the policy information;

acquiring, by the PE module using the Ia reference point, the service policy that is determined by the PD module;

providing, by the PE module according to the service policy, a service that is requested by the service request information;

sending, by the PE module, to the NSE using an Mcn reference point, service request information that comprises the translated policy information; and sending, by the PE module, to the second CSF module using an Ic reference point, the service policy that is determined by the PD module, wherein the Ic reference point comprises an interface for performing communication between the PE module and the second CSF module.

\* \* \* \* \*